United States Patent [19]

Woditsch et al.

[11] 4,179,306
[45] Dec. 18, 1979

[54] STABILIZING TITANIUM DIOXIDE PIGMENTS WITH VANADATES

[75] Inventors: Peter Woditsch; Eckhard Bayer; Peter Panek; Heribert Stütgens, all of Krefeld, Fed. Rep. of Germany

[73] Assignee: Bayer Aktiengesellschaft, Leverkusen, Fed. Rep. of Germany

[21] Appl. No.: 913,711

[22] Filed: Jun. 8, 1978

[30] Foreign Application Priority Data

Jun. 30, 1977 [DE] Fed. Rep. of Germany ....... 2729496

[51] Int. Cl.² .............................................. G04B 31/02
[52] U.S. Cl. .................................. 106/300; 106/308 B; 106/299
[58] Field of Search .............................. 106/300, 308 B

[56] References Cited

U.S. PATENT DOCUMENTS

| | | | |
|---|---|---|---|
| 2,062,137 | 11/1963 | McKinney | 106/300 |
| 2,231,455 | 2/1941 | Schaumann | 106/300 |
| 3,981,737 | 9/1976 | Evilampi | 106/300 |
| 4,036,662 | 7/1977 | Hund | 106/300 |

FOREIGN PATENT DOCUMENTS 2545243  4/1977  Fed. Rep. of Germany .......... 106/300

*Primary Examiner*—Sam Silverberg
*Attorney, Agent, or Firm*—Sprung, Felfe, Horn, Lynch & Kramer

[57] ABSTRACT

A process for the production of a light-stable and weather-stable titanium dioxide pigment comprising precipitating onto the pigment in aqueous suspension a colorless vanadate of at least one of zinc, magnesium, calcium, strontium and barium at a pH-value above 7 in about 0.01 to 5% by weight, expressed as $V_2O_5$, based on $TiO_2$. Advantageously the pigment either before or after precipitation of the vanadate is coated with at least one oxide, oxide hydrate or phosphate of titanium, silicon, aluminum or zirconium.

4 Claims, No Drawings

STABILIZING TITANIUM DIOXIDE PIGMENTS WITH VANADATES

Most of the fields in which $TiO_2$-pigments are used require high light and weather stability. Attempts have been made to satisfy these requirements by subjecting the pigments to lattice stabilization and also to an after-treatment with aluminum-titanium-zirconium and/or with silicon oxides or oxide hydrates or phosphates. It is also known in this connection that $TiO_2$-pigments can be treated with transition metal compounds, such as vanadium oxides for example. British Pat. No. 501,805 describes a process for the production of $TiO_2$-pigments for pigmenting plastics in which small quantities of a vanadium compound, preferably in the form of an aqueous solution, are applied to the $TiO_2$-pigment, followed by drying to prevent the pigments from yellowing. The resulting pigments are particularly suitable for use in the production of rayon.

German Offenlegungsschrift No. 2,407,429 describes a process for the production of $TiO_2$-pigments of anatase structure which, by virtue of their light stability, may be used for delustering manmade fibers. In this process, a water-soluble vanadium compound, for example $NH_4VO_3$, is added to the $TiO_2$ suspension, followed by the precipitation of vanadium oxide. Drying takes place at temperature below 300° C. According to U.S. Pat. No. 2,062,137, $TiO_2$ is mixed with vanadium compounds and the resulting mixture is calcined at temperature of 800° C.

The known processes are attended by the disadvantage that the pigments obtained show reduced whiteness.

The present invention provides a process for the production of light-stable and weather-stable titanium dioxide pigments by coating the pigment with vanadium compounds in aqueous suspension, filtering, optionally washing and then drying the after-treated pigment, wherein colorless vanadates of zinc, magnesium, calcium, strontium and/or barium are precipitated at a pH-value above 7 onto the pigment in quantities of about 0.01 to 5% by weight, expressed as $V_2O_5$, based on $TiO_2$.

It has surprisingly been found that optimum light and weather stability of the $TiO_2$-pigments can be obtained without any reduction in their whiteness by carrying out the after-treatment with special vanadium compounds under quite specific process conditions. In this connection, it is essential to maintain an alkaline pH-range during the after-treatment which must be observed not only during precipitation of the vanadate, but also during the subsequent treatment, such as filtration, washing and drying.

The process according to the invention is eminently suitable both for light stabilization and also for weather stabilization and may be coupled with any of the after-treatments normally applied to $TiO_2$. Stabilization levels exceeding the level obtained by the known treatment are obtained irrespective of whether the coating of $TiO_2$-pigments with oxides and/or oxide hydrates and/or phosphates of titanium, silicon, aluminum, zirconium, etc. is carried out before or after precipitation of the vanadate. The process according to the invention is equally suitable for the aftertreatment of anatase and rutile.

The order in which the vanadate solutions and corresponding salts of zinc or the alkaline earth metals are added is not critical, nor is the quantity of cations required for precipitation. It is particularly preferred to use an excess of cations for precipitation in order to precipitate the vanadates as completely as possible. The molar ratio of the alkaline earth or zinc ions to the vanadate ions may be in the range of from about 0.5 to 15, a ratio of from about 1 to 5 being preferred.

Suitable vanadates are, for example, ammonium, sodium, or potassium vanadates, from which the corresponding substantially insoluble vanadates are precipitated by means of the alkaline earth or zinc ions. It is particularly preferred to precipitate the vanadates, expressed as $V_2O_5$, in quantities of about 0.05 to 0.5% by weight, based on $TiO_2$.

The process according to the invention is illustrated by the following examples:

EXAMPLE 1

2.4 kg of a Raymond-ground $TiO_2$-pigment were suspended in 7.2 liters of water and heated to 60° C. This was followed by the successive addition of 1% of $TiO_2$ in the form of $TiOSO_4$-solution, 0.8% of $SiO_2$ in the form of Na-silicate solution and 2.2% of $Al_2O_3$ in the form of aluminum sulphate solution. The pH-value was adjusted to 7.5, after which 4.6 g of $NH_4VO_3$, dissolved in 600 ml of water, were added to the suspension, corresponding to a $V_2O_5$-content of 0.15%, based on the pigment. Following the addition of the vanadate, 43.3 g of $CaCl_2 \cdot 6 H_2O$ were dissolved in 100 ml of water and added to the pigment suspension together with 27 ml of 50% sodium hydroxide solution, the pH-value increasing from 7.4 to 9.5. The after-treated $TiO_2$-pigment was filtered off, washed, dried and ground in a steam jet mill. The test data are set out in Table 1.

EXAMPLE 2

For comparison, the same treatment as in Example 1 was carried out with the same starting titanium dioxide, but without the precipitation of Ca-vanadate on completion of coating and with 1% of $TiO_2$, 0.8% of $SiO_2$ and 2.2% of $Al_2O_3$.

Both pigments were tested as follows for color, lightness and weather stability:

Color and lightness were determined by the test specified in DIN 55980, according to which the pigment is worked into a binder and the standard color values X, Y and Z of the specimen are determined at various points by means of an Elrepho tester. The color interval and difference in lightness from a comparison pigment is calculated from the standard color values by a process for the approximate sensitometric determination of color differences based on DIN 6174 (Preliminary Standard).

Weather stability was tested by working the pigments into a lacquer binder based on an alkyd resin with a pigment volume concentration of 15%. After dispersion in a planetary mill, the lacquer was applied to sheets of aluminum and, after minimum ageing for 8 days, was Weatherometer-tester with a No. 3 sprinkling/drying cycle of 17 minutes. The chalking behavior of the lacquer films was determined by the Kempf pestle test according to DIN 53159. A chalking mark is calculated from the weathering times up to chalking stage 1 (beginning of chalking) X 1 and up to chalking stage 5 (heavy chalking) X 5 by comparison with a standard pigment which has times S 1 and S 5 up to the chalking stages 1 and 5 respectively, in accordance with the following relation:

$N = X\,1/S\,1 + X\,5/S\,5 \cdot 100/2$

The higher the value of N, the more stable the pigment. The corresponding values are shown in Table 1.

EXAMPLE 3

The TiO$_2$-pigment of Example 1 was aftertreated in the same way as in Example 1, except that 0.6% of V$_2$O$_5$ in the form of a vanadate solution was used for precipitation.

Testing was carried out in accordance with Example 2 and produced the results set out in Table 1.

EXAMPLE 4

The TiO$_2$ used in the preceding examples was treated in accordance with Example 3 of German Offenlegungsschrift No. 2,407,429, 0.15% of V$_2$O$_5$ in the form of an NH$_4$VO$_3$-solution was added and the pH-value was adjusted to pH 8.5 by the addition of Na$_2$CO$_3$-solution. The pigment was used for comparison and was tested for whiteness in accordance with Example 2. Since the test specimen already showed a distinctly visible yellow tinge, it was not Weatherometer-tested.

The TiO$_2$-rutile pigments produced in accordance with Examples 1 to 4 gave the following results:

Table 1:

| | Chalking mark | Color of white specimens | |
|---|---|---|---|
| | | color tinge | lightness |
| Example 1 | 125 | no color tinge | − 0.1 |
| Example 2 | 100 | reference | 0.0 |
| Example 3 | 134 | no color tinge | − 0.6 |
| Example 4 (Comparison) | not determined | 0.6 yellow | − 0.3 |

The values set out in Table 1 clearly demonstrate the advance obtained by the process according to the invention for coating TiO$_2$-pigments with colorless Ca-vanadate. Even where 0.6% of V$_2$O$_5$ in the form of calcium vanadate is precipitated in the presence of TiO$_2$, it is possible to obtain pigments which, after steam jet grinding, do not show any tinges of yellow and are therefore far superior to the TiO$_2$ pigments treated with 0.15% of V$_2$O$_5$ in accordance with German Offenlegungsshcrift No. 2,407,429. In every case, their weather stability is greater than that of titanium dioxide pigments coated with SiO$_2$ and Al$_2$O$_3$ by 25% (Example 1) and 34% (Example 3).

EXAMPLE 5

TiO$_2$ was treated in the same way as in Example 1, except that the further treatment after the precipitation of SiO$_2$ and Al$_2$O$_3$ was carried out by the addition of 0.1% of V$_2$O$_5$ in the form of NH$_4$-vanadate and, following the addition of twice the molar quantity of CaCl$_2$, the pH-value was increased by the addition of NH$_3$ to precipitate Ca-vanadate onto the after-treated TiO$_2$. Testing was carried out by comparison with the corresponding pigment according to Example 2 which has not been treated with vanadium and revealed considerable weather stabilization without any deterioration in color (Table 2).

EXAMPLE 6

1% of TiO$_2$ in the form of TiOSO$_4$-solution was added to a TiO$_2$-pigment and the pH-value was adjusted to 10 by the addition of sodium hydroxide. 0.15% of V$_2$O$_5$ was precipitated at this pH-value of 10 by the simultaneous addition of NH$_4$VO$_4$-solution and CaCl$_2$-solution in a molar ratio of 1:5. 2%, based on the pigment, of SiO$_2$ in the form of a waterglass solution (360 g of SiO$_2$ per liter) were then added and 2.2% of Al$_2$O$_3$ precipitated by the addition of Al-sulphate solution and sodium hydroxide. The final pH of this specimen was 7.5. Testing was carried out in accordance with Example 2. The results are set out in Table 2 and do not show any change in color in relation to the comparison pigment with not precipitation of Ca-vanadate, despite a distinct improvement in weather stability.

EXAMPLE 7

In order to demonstrate the critical influence of the pH-value, a treatment with 1% of TiO$_2$, 0.15% of V$_2$O$_5$ in the form of Ca-vanadate and 0.8% of SiO$_2$ in addition to 2.2% of Al$_2$O$_3$ was carried out in the same way as in Example 6, except that the pH-value fell to pH 5 during precipitation of the Al$_2$O$_3$. After stream jet grinding, the TiO$_2$ thus treated was bright yellow in color and could no longer be used as a white pigment.

EXAMPLE 8

The after-treatment of TiO$_2$ with a colorless vanadate after the precipitation of TiO$_2$, SiO$_2$ and Al$_2$O$_3$ was carried out with the same quantities and in the same way as in Example 1, except that the CaCl$_2$-solution was replaced by the same molar quantity of a magnesium chloride solution in order to precipitate a colorless Mg-vanadate. This example demonstrates that Ca-vanadate can be replaced by Mg-vanadate and shows that it is also possible to use other colorless alkaline earth vanadates for weather stabilisation without any loss of whiteness. The test results are set out in Table 2.

EXAMPLE 9

TiO$_2$ was after-treated in the same way as in Example 1, except that 5% of V$_2$O$_5$ in the form of colorless Ca-vanadate was precipitated by the addition of a corresponding ammonium vanadate solution and a five-fold molar excess of a CaCl$_2$-solution. The after-treatment layer does not affect the filtration behavior of the pigments and leads to a slight yellowing of 0.2 AN-units for V$_2$O$_5$ after-treatment quantities of this order. There was no change in the lightness of the pigment coated with Ca-vanadate in relation to the comparison pigment which has not been coated with vanadate. Stability as determined by Weatherometer testing exceeded that of the comparison pigment by 109%.

Table 2:

| Testing of pigments for weather stability and whiteness | | | |
|---|---|---|---|
| | Chalking mark | Color | Lightness |
| Example 5 with Ca-vanadate | 134 | no color tinge | − 0.2 |
| Example 5 without Ca-vanadate | 100 | reference | 0.0 |
| Example 6 | 150 | no color tinge | + 0.1 |
| Example 7 | not determined | 1.5 yellow | − 0.3 |
| Example 8 Mg-vanadate | 104 | no color tinge | 0.0 |
| Example 9 | 209 | 0.2 yellow | 0.0 |

EXAMPLE 10

2 kg of a Raymond-ground $TiO_2$-pigment were suspended in 6 liters of water, followed by the addition of 1.5% of $Al_2O_3$ in the form of basic aluminum nitrate solution and the addition of 5% sodium hydroxide solution up to a pH-value of 6.6. 1.4% of $P_2O_5$ and 1.0% of $Al_2O_3$, respectively in the form of $Na_2HPO_4$ and $Al_2(SO_4)_3$-solution, were then added at pH 5.5. After the pH-value had been adjusted to 7.5 by the addition of sodium hydroxide, 200 ml of an $NH_4$-vanadate solution in water containing 15 g of $V_2O_5$ per liter were added to the suspension, corresponding to a content of 0.15% of $V_2O_5$ based on the pigment, followed by the addition of 36.75 g of $CaCl_2 \cdot 6 H_2O$, dissolved in 100 ml of water, together with 25 ml of 50% sodium hydroxide solution, corresponding to a Ca:V-ratio of 4:1. On completion of the after-treatment, the suspension had a pH-value of 9.5. The after-treatment pigment was filtered off, washed, dried at 150° C. and ground in a steam jet mill. The test data of the product are set out in Table 3.

EXAMPLE 11

For comparison, the after-treatment described in Example 10 was carried out in the same way with the same pigment, but with the difference that the precipitation of 1.4% of $P_2O_5$ and 1.0% of $Al_2O_3$ was not followed by the precipitation of Ca-vanadate. Both pigments were tested for color and lightness in accordance with Example 2. In addition, the light stability was tested as follows in laminated papers:

To this end, a raw paper was produced in a batch-type sheet paper former (manufactured by the Haage company of Mulheim/Ruhr) from 2.72 g of pigment, 270 ml of sulphite pulp suspension (10 g/l of pulp, 4% of retention agent, based on pulp) and filtered drinking water (pigment content of the raw paper after ashing 23–27%). Strips of this raw paper were impregnated with 50% aqueous melamine resin solution and, after drying, were pressed between two steel plates for 7 minutes at 150° C. under a pressure of 7 t. The remission value (Ry) of the laminates thus obtained was measured with an Elrepho tester before and after exposure (4 h, Ultravitalux lamps, rotating disc), to give the value $\Delta$ Ry (1). The quotient $\alpha = \Delta$ Ry (1) $/\Delta$ Ry (2) (where $\Delta$ Ry (2) corresponds to the difference in the Y-remission before and after exposure of a standard pigment) is a measure of the light stability of the tested pigment. $\alpha$-values below 1 signify that the tested pigment has a higher light stability than the standard pigment, while $\alpha$-values above 1 signify that the light stability of the standard pigment is not reached.

EXAMPLE 12

The titanium dioxide pigment used in Examples 10 and 11 was after-treated with 1.5% of $Al_2O_3$ in the form of a sodium aluminate solution, followed by pH-adjustment to 6.6 by the addition of sulphuric acid, and then in accordance with Example 10 with 1.4% of $P_2O_5$ and 1.0% of $Al_2O_3$, respectively in the form of $Na_2HPO_4$ and $Al_2(SO_4)_3$-solution, at a pH-value of 5.5. After the pH-value had been adjusted to 7.5 by the addition of sodium hydroxide, 66.7 ml of an $NH_4$-vanadate solution in water containing 15 g of $V_2O_5$ per liter were added to the suspension, corresponding to 0.05% of $V_2O_5$, based on the pigment, followed by the addition of 12.3 g of $CaCl_2 \cdot 6 H_2O$ dissolved in water, corresponding to a Ca:V-ratio of 4:1. On completion of the after treatment, the suspension had a pH-value of 7.5. The after-treatment pigment was filtered off, washed, dried for 18 hours at 150° C. and ground in a steam jet mill. The product was tested by comparison with the corresponding pigment of Example 11 which had not been treated with vanadium. The test results in Table 3 show the considerable light-stabilizing effect obtained with even small additions of vanadium without any deterioration in color.

EXAMPLE 13

In order to demonstrate the influence of increasing precipitations of vanadium upon light stability without any change in color and with only a slight reduction in the lightness of the pigment, the $TiO_2$ used in Example 12 was after-treated in the same way as in that example except that the Ca-vanadate was precipitated onto the pigment in a quantity correspondinfg to 0.2% of $V_2O_5$. As can be seen from Table 3, a further improvement in light stability of around 10% over the pigment of Example 12 is obtained without any change in color and with a reduction in lightness of only 0.2 units.

Table 3:

| | Testing of pigments for light stability, color and lightness value | |
|---|---|---|
| | | Color of white specimens |
| Light stability | color tinge | lightness reference value |
| Example 10 with Ca-vanadate 0.37 | no color tinge | 0.0 |
| Example 11 1.12 | reference | 0.0 |
| Example 12 with Ca-vanadate 0.76 | no color tinge | 0.0 |
| Example 13 with Ca-vanadate 0.68 | no color tinge | − 0.2 |
| Example 14 with Zn-vanadate 0.67 | 0.2 yellow | + 0.1 |

EXAMPLE 14

The after-treatment of the pigment used in Examples 10 to 13 with a colorless vanadate after the precipitation of $Al_2O_3$ and Al-phosphate was carried out with the same quantities and in the same way as in Example 12, except that the $CaCl_2$-solution was replaced by five times the molar quantity of a zinc chloride solution in water in order to precipitate a colorless Zn-vanadate. The product obtained is comparable in its light stability to a pigment after-treated with a corresponding quantity of $V_2O_5$ in the form of Ca-vanadate. In addition, some slight yellowing (0.2 AN units) is observed, coupled with an increase in lightness of 0.1 unit (Table 3).

It will be appreciated that the instant specification and examples are set forth by way of illustration and not limitation, and that various modifications and changes may be made without departing from the spirit and scope of the present invention.

What we claim is:

1. A process for the production of a light-stable and weather-stable titanium dioxide pigment comprising precipitating onto the pigment in aqueous suspension a colorless vanadate of at least one of zinc, magnesium, calcium, strontium and barium at a pH-value above 7 in about 0.01 to 5% by weight, expressed as $V_2O_5$, based on $TiO_2$.

2. A process according to claim 1, including the further steps of filtering off the pigment, washing and drying it.

3. A process according to claim 1, wherein the pigment either before or after precipitation of the vanadate is coated with at least one oxide, oxide hydrate or phosphate of titanium, silicon, aluminum or zirconium.

4. A process according to claim 3, wherein the vanadate is precipitated in about 0.5% by weight, the process including the further steps of filtering off the pigment, washing and drying it.

* * * * *

UNITED STATES PATENT AND TRADEMARK OFFICE
CERTIFICATE OF CORRECTION

PATENT NO. : 4,179,306
DATED : Dec. 18, 1979
INVENTOR(S) : Peter Woditsch et al

It is certified that error appears in the above—identified patent and that said Letters Patent is hereby corrected as shown below:

Column 8, line 1  After "about" insert 0.05 to--.

Signed and Sealed this

Fifth Day of May 1981

[SEAL]

Attest:

RENE D. TEGTMEYER

Attesting Officer   Acting Commissioner of Patents and Trademarks